(12) United States Patent
Gal (10) Patent No.: US 10,070,019 B2
(45) Date of Patent: Sep. 4, 2018

(54) METHOD OF REDUCING COLOR MOIRE AND IMAGE PROCESSING APPARATUS USING THE METHOD

(71) Applicant: Hanwha Techwin Co., Ltd., Changwon-si (KR)

(72) Inventor: Jun Ho Gal, Siheung-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/469,661

(22) Filed: Mar. 27, 2017

(65) Prior Publication Data

US 2018/0139363 A1    May 17, 2018

(30) Foreign Application Priority Data

Nov. 16, 2016    (KR) .................. 10-2016-0152970

(51) Int. Cl.
*H04N 5/217*    (2011.01)
*H04N 1/60*    (2006.01)
*H04N 5/232*    (2006.01)
*H04N 9/04*    (2006.01)
*H04N 9/64*    (2006.01)

(52) U.S. Cl.
CPC .......... *H04N 5/217* (2013.01); *H04N 1/6027* (2013.01); *H04N 5/23216* (2013.01); *H04N 5/23293* (2013.01); *H04N 9/045* (2013.01); *H04N 9/646* (2013.01)

(58) Field of Classification Search
CPC ................................ H04N 5/21; H04N 5/357
USPC ........................................................ 348/241
See application file for complete search history.

(56) References Cited

U.S. PATENT DOCUMENTS

| | | | |
|---|---|---|---|
| 6,927,804 B2 | 8/2005 | Adams, Jr. et al. | |
| 2005/0220337 A1* | 10/2005 | Arazaki | H04N 9/045 |
| | | | 382/162 |
| 2013/0222531 A1* | 8/2013 | Hirai | H04N 1/58 |
| | | | 348/32 |
| 2016/0163027 A1 | 6/2016 | Gal | |

FOREIGN PATENT DOCUMENTS

| | | |
|---|---|---|
| JP | 5-242239 A | 9/1993 |
| KR | 10-2010-0041026 A | 4/2010 |
| KR | 10-2016-0068463 A | 6/2016 |

* cited by examiner

*Primary Examiner* — Anthony J Daniels
(74) *Attorney, Agent, or Firm* — Sughrue Mion, PLLC (57) ABSTRACT

A method of reducing moire includes generating a moire corrected image by performing moire correction on an input image; setting a moire correction weight for each pixel of the input image based on global luminance of the input image and local luminance of an area including the pixel; and correcting the moire corrected image by synthesizing the input image and the moire corrected image based on the moire correction weight.

18 Claims, 5 Drawing Sheets

METHOD OF REDUCING COLOR MOIRE AND IMAGE PROCESSING APPARATUS USING THE METHOD

CROSS-REFERENCE TO THE RELATED APPLICATION

This application claims priority from Korean Patent Application No. 10-2016-0152970, filed on Nov. 16, 2016, in the Korean Intellectual Property Office, the disclosure of which is incorporated herein in its entirety by reference.

BACKGROUND

1. Field

Methods and apparatuses consistent with exemplary embodiments relate to a method and an apparatus for reducing color moire.

2. Description of the Related Art

The moire effect is a sort of aliasing effect generated when a sampling frequency of an image sensor is lower than a frequency of a subject for photography. To prevent the moire effect, an optical low pass filter may be arranged between the image sensor and a lens. However, it requires a separate double refractive element, and even a portion where moire does not occur is also filtered thereby degrading sharpness of an image.

SUMMARY

One or more exemplary embodiments include a method of processing an image, by which color moire may be reduced and an undesired color smear effect may be prevented.

According to an aspect of an exemplary embodiment, there is provided a method of reducing moire, the method including: generating a moire corrected image by performing moire correction on an input image; setting a moire correction weight for each pixel of the input image based on global luminance of the input image and local luminance of an area including the pixel; and correcting the moire corrected image by synthesizing the input image and the moire corrected image based on the moire correction weight.

The setting of the moire correction weight may include: calculating a global luminance average value of the input image and a local luminance average value of the area including the pixel; determining a largest value from among differences between local luminance average values for respective colors to be a first maximum difference value; and setting the moire correction weight of the pixel based on the first maximum difference value.

The setting of the moire correction weight may include generating a second maximum difference value by correcting the first maximum difference value; and setting the moire correction weight of the pixel using the second maximum difference value, and wherein the second maximum difference value is a smaller value between the first maximum difference value and a threshold value.

The threshold value may be determined by an input received through a user interface.

The threshold value may be one of the global luminance average value and the local luminance average value.

The threshold value may be a value obtained by applying a weight to one of the global luminance average value and the local luminance average value.

The weight may be determined by an input received through a user interface.

The area may be determined by an input received through a user interface.

The moire correction weight may be determined based on a ratio of the second maximum difference value to the threshold value.

At least one of an upper limit value and a lower limit value may be set to at least one of the global luminance average value and the local luminance average value, and the upper limit value and the lower limit value are determined by an input received through a user interface.

According to an aspect of an exemplary embodiment, there is provided an image processing apparatus including at least one processor to implement: a first unit configured to generate a moire corrected image by performing moire correction on an input image and set a moire correction weight for each pixel of the input image based on global luminance of the input image and local luminance of an area including the pixel; and a second unit configured to correct the moire corrected image by synthesizing the input image and the moire corrected image based on the moire correction weight.

The first unit may include: an average calculation unit configured to calculate a global luminance average value of the input image and a local luminance average value of the area including the pixel, and calculate a largest value from among differences between local luminance average values for respective colors to be a first maximum difference value; and a weight setting unit configured to set the moire correction weight of the pixel based on the first maximum difference value.

The weight setting unit may be further configured to calculate a second maximum difference value by correcting the first maximum difference value and set the moire correction weight of the pixel using the second maximum difference value, and wherein the second maximum difference value is a smaller value between the first maximum difference value and a threshold value.

The threshold value may be determined by an input received through a user interface.

The threshold value may be one of the global luminance average value and the local luminance average value.

The threshold value may be a value obtained by applying a weight to one of the global luminance average value and the local luminance average value.

The weight may be determined by an input received through a user interface.

The area may be determined by an input received through a user interface.

The moire correction weight may be determined based on a ratio of the second maximum difference value to the threshold value.

At least one of an upper limit value and a lower limit value may be set to at least one of the global luminance average value and the local luminance average value, and the upper limit value and the lower limit value are determined by an input received through a user interface.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following description just illustrates the fundamentals of the inventive concept. Therefore, those of ordinary skill in the art may embody the fundamentals of the inventive concept and invent various apparatuses included in the scope of the inventive concept although the fundamentals of the inventive concept are not clearly described or illustrated in the specification. Also, conditional terms and embodiments in the specification are only intended to describe the inventive concept, and it should be understood that the scope of the inventive concept is not limited by the conditional terms and embodiments. Also, it should be understood that all of descriptions of fundamentals, aspects, embodiments of the inventive concept, and certain embodiments are intended to include structural and functional equivalents thereof. Also, it should be understood that such equivalents include not only well-known equivalents but also all equivalents that will be invented to perform the same function regardless of a structure thereof.

Thus, functions of various devices illustrated in the drawing including functional blocks represented as processors or similar concepts may be provided not only by using dedicated hardware but also by using hardware capable of performing relevant software. When provided by processors, the functions may be provided by a single dedicated processor, a single shared processor, or a plurality of individual processors, some of which may be shared. Also, terms used for a processor, control, or similar concepts may not be understood as exclusively citing hardware capable of performing software, and they may be understood as suggestively including digital signal processor (DSP) hardware, a read only memory (ROM), a random access memory (RAM), and a nonvolatile memory for storing software without limitation. Other well-known hardware structures may also be included.

The above advantages, features, and aspects of the inventive concept will become apparent from the following description of exemplary embodiments with reference to the accompanying drawings. In the following description, detailed descriptions of well-known functions or configurations will be omitted since they would unnecessarily obscure the subject matters of the inventive concept.

It will also be understood that the terms "comprises", "includes", and "has" used herein specify the presence of stated elements, but do not preclude the presence or addition of other elements, unless otherwise defined.

Figure 1:
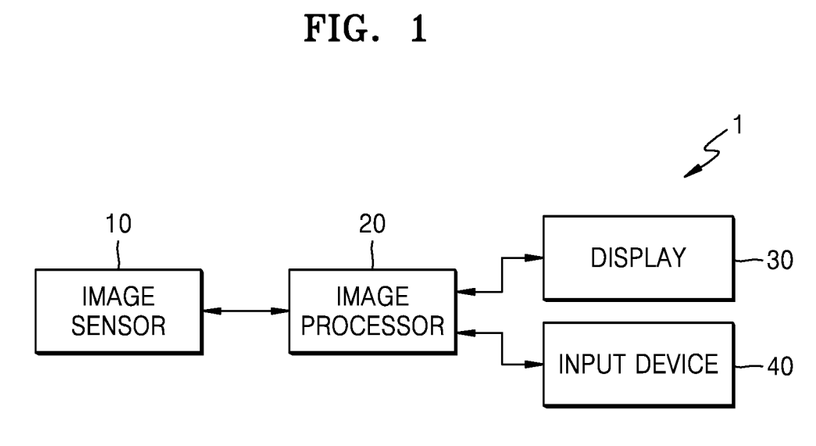
FIG. 1 is a schematic block diagram of an image processing apparatus according to an exemplary embodiment.

FIG. 1 is a schematic block diagram of an image processing apparatus 1 according to an exemplary embodiment.

Referring to FIG. 1, the image processing apparatus 1 may include an image sensor 10, an image processor 20, and a display 30.

The image processing apparatus 1 may be surveillance cameras. For example, the image processing apparatus 1 may be visual cameras, thermal cameras, special purpose cameras, portable cameras, camcorders, mobile devices, or other various apparatuses capable of expressing a moving picture.

The image sensor 10, the image processor 20, and the display 30 may be implemented in one device. Alternatively, the image processing apparatus 1 may be an image processing system in which at least one of the image sensor 10, the image processor 20, and the display 30 is separated from the other(s) and transceives data in a wired or wireless manner.

The image sensor 10 may be a photoelectric conversion element such as charge coupled devices (CCDs) or complementary metal oxide semiconductor (CMOSs). The image sensor 10 acquires image information by capturing an image of a front scene. A lens receiving an optical signal may be provided at a front end of the image sensor 10.

The image processor 20 may be implemented by various numbers of hardware and/or software components performing specific functions. For example, The image processor 20 may employ direct integrated circuit configurations such as memory, processing, logic, look-up tables, etc., which can perform various functions by control of one or more microprocessors or by other control devices. The function of the image processor 20 may be implemented in a programming or scripting language, including various algorithms implemented in a data structure, processes, routines, or a combination of other programming components.

The image processor 20 may perform a moire correction function to reduce a moire effect generated in an image. For example, the image processor 20 may perform moire correction through color blurring.

When color blurring is applied to an image, a color smear effect may occur in an edge of an object that did not have moire. A color histogram or RGB average values of an area where moire is generated is uniform. In contrast, a color histogram or RGB average values of an area where moire is not generated are different from each other. In particular, the color histogram or RGB average values in the edge area of an object is quite different from each other. Here, the image may be a color image.

Accordingly, as the image processor 20 may control a degree of moire correction by pixels, a color blurring effect may be deceased in an area where a difference of RGB average values is large, such as the edge area of an object, and may be increased in an area where the difference of RGB average values is small. The image processor 20 may correct an image by setting a moire correction weight based on global luminance of the image and local luminance of an area including a pixel of the image, and adjusting a degree of synthesis of an original image and a color blurred moire correction image by pixels using the moire correction weight.

The image processor 20 may set a maximum difference value based on local luminance average values for the respective colors of a pixel and differences between the local luminance average values. Then, the image processor 20 may set a moire correction weight of a pixel based on the maximum difference value. The image processor 20 may adjust the maximum difference value by controlling a threshold value. The bright and pixel values of an image may be a luminance value.

The display 30 may perform signal processing on an image output from the image processor 20 and provide the image to a user. Examples of the display 30 may be, but are not limited to, a liquid crystal display (LCD) panel, an organic light-emitting display (OLED) panel, an electrophoretic display (EPD) panel, etc. The display 30 may be a touch screen that receives a user's touch input, and may operate as a user input interface.

An input device 40 may be connected to the image processor 20 in a wired or wireless manner and enable the user to generate input data to control the image processor 20. Examples of the input device 40 may be, but are not limited to, a keypad, a dome switch, a touch pad (a contact capacitive type, a pressure resistive film type, an infrared detection type, a surface ultrasonic conduction type, an integral tension measurement type, a piezo effect type, etc.), a mouse, a remote controller, a jog wheel, a jog switch, etc. The user may input parameters for moire correction, such as a threshold value, a block size, a limit value, etc.

Figure 2:
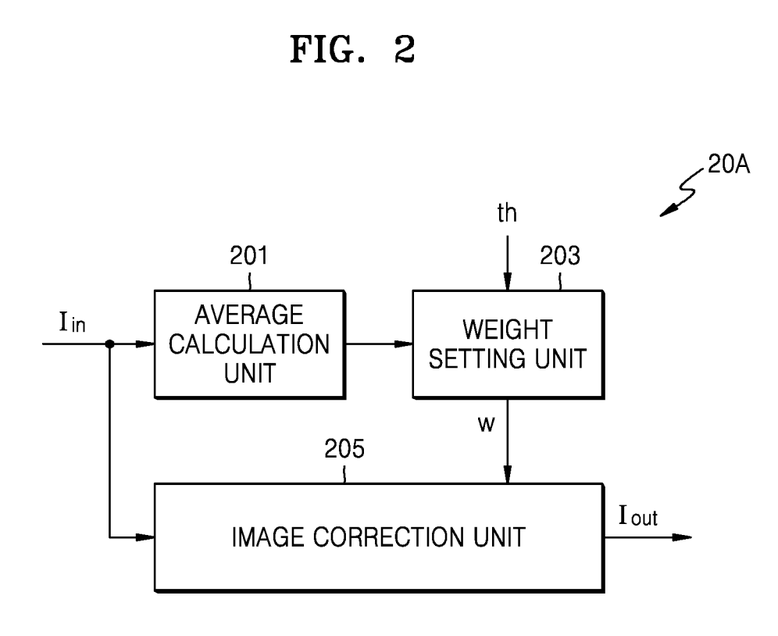
FIG. 2 is a schematic block diagram of a color moire reduction unit according to an exemplary embodiment.

FIG. 2 is a schematic block diagram of a color moire reduction unit 20A according to an exemplary embodiment.

The moire reduction unit 20A according to an embodiment may be implemented as a part of the image processor 20 of FIG. 1. Alternatively, the moire reduction unit 20A may be implemented as another processor. The moire reduction unit 20A may include an average calculation unit 201, a weight setting unit 203, and an image correction unit 205.

The average calculation unit 201 may calculate local luminance average values for the respective colors (RGB) of each pixel, a difference between the local luminance average values for the respective colors, and a maximum difference value, of an input image. In the following description, one pixel, for example, a pixel having coordinates (i, j) (hereinafter, referred to as the "current pixel"), in a currently input image is described.

$$LM\_R[i, j] = \sum_{k \in [-n, +n]} \sum_{l \in [-m, +m]} IN\_R[i+k, j+l] \div ((2n+1) \times (2m+1))$$

$$LM\_G[i, j] = \sum_{k \in [-n, +n]} \sum_{l \in [-m, +m]} IN\_G[i+k, j+l] \div ((2n+1) \times (2m+1))$$

$$LM\_B[i, j] = \sum_{k \in [-n, +n]} \sum_{l \in [-m, +m]} IN\_B[i+k, j+l] \div ((2n+1) \times (2m+1))$$

[Equation 1]

Referring to Equation 1 above, the average calculation unit 201 may calculate local luminance average values for the respective colors of a current pixel based on RGB values of adjacent pixels. Specifically, an input red value IN_R, an input green value IN_G, and an input blue value IN_B, of each pixel of a pixel block around the current pixel, e.g., (2n+1)×(2m+1) blocks where n≥0 and m≥0, may be used to calculate the local luminance average values.

The size of a block may be changed according to a resolution of an image. For example, the user may set a large block for a high-resolution camera system such as a digital single-lens reflex (DSLR) camera and a small block for a low-resolution camera system such as a car black box.

The local luminance average values for the respective colors may include a red local average value LM_R[i, j], a green local average value LM_G[i, j], and a blue local average value LM_B[i, j]. The red local average value LM_R[i, j] of the current pixel is an average value of the input red values IN_R of pixels in a block. The green local average value LM_G[i, j] of the current pixel is an average value of the input green values IN_G of pixels in a block. The blue local average value LM_B[i, j] of the current pixel is an average value of the input blue values IN_B of pixels in a block.

$$AD\_RG[i,j] = abs(LM\_R[i,j] - LM\_G[i,j])$$

$$AD\_GB[i,j] = abs(LM\_G[i,j] - LM\_B[i,j])$$

$$AD\_BR[i,j] = abs(LM\_B[i,j] - LM\_R[i,j])$$

$$MAD\_RGB[i,j] = \max(AD\_RG[i,j], AD\_GB[i,j], AD\_BR[i,j])$$

[Equation 2]

As shown in Equation 2 above, the average calculation unit 201 may calculate a maximum value among differences between the local luminance average values for the respective colors of the current pixel. AD_RG[i, j] denotes a difference between the red local average value LM_R[i, j] and the green local average value LM_G[i, j] of the current pixel, which may be an absolute value. AD_GB[i, j] denotes a difference between the green local average value LM_G[i, j] and the blue local average value LM_B[i, j] of the current pixel, which may be an absolute value. AD_BR[i, j] denotes a difference between the blue local average value LM_B[i, j] and the red local average value LM_R[i, j] of the current pixel, which may be an absolute value. The average calculation unit 201 may select a maximum from among the differences as a maximum difference value MAD_RGB[i, j].

If MAD_RGB[i, j] is high, it may be determined that the current pixel is included in an edge area of an object. If MAD_RGB[i, j] is low, it may be determined that the current pixel is included in an area having moire or in an area in which a color smear effect is not likely to occur by moire correction.

$$thMAD\_RGB[i,j] = \min(MAD\_RGB[i,j], th)$$ [Equation 3]

The weight setting unit 203 may use a threshold value th to evaluate MAD_RGB[i, j]. For example, if MAD_RGB[i, j] is equal to or greater than the threshold value th as shown in Equation 3, weight setting unit 203 may cut off the overage to output the value as a corrected maximum difference value thMAD_RGB[i, j]. In other words, the weight setting unit 203 may compare the maximum difference value MAD_RGB[i, j] and the threshold value th, and determine a smaller value between the maximum difference value MAD_RGB[i, j] and the threshold value th to be a corrected maximum difference value thMAD_RGB[i, j].

$$W\_MOIRE[i,j] = thMAD\_RGB[i,j]/th$$ [Equation 4]

The weight setting unit 203 may set a moire correction weight of the current pixel based on the corrected maximum difference value of the current pixel. Referring to Equation 4 above, the weight setting unit 203 may set a moire correction weight W_MOIRE[i, j] based on the corrected maximum difference value thMAD_RGB[i, j] of the current pixel and the threshold value th. The threshold value th, which may be a constant or a function determined based on experiences or experiments. The threshold value th may be set by a user input.

The image correction unit 205 may perform moire correction by performing color blurring on an input image and adjust a degree of the moire correction for each pixel by using the moire correction weight W_MOIRE[i, j]. The image correction unit 205 may output a final correction image obtained by weighted summing, i.e., synthesizing, the input image and a moire correction image obtained by performing color blurring on the input image.

$$PO\_R[i,j]=W\_MOIRE[i,j] \times IN\_R[i,j]+(1-W\_MOIRE[i,j]) \times AM\_R[i,j]$$

$$PO\_G[i,j]=W\_MOIRE[i,j] \times IN\_G[i,j]+(1-W\_MOIRE[i,j]) \times AM\_G[i,j]$$

$$PO\_B[i,j]=W\_MOIRE[i,j] \times IN\_B[i,j]+(1-W\_MOIRE[i,j]) \times AM\_B[i,j] \quad \text{[Equation 5]}$$

As shown above in Equation 5, the image correction unit 205 may output a final correction value PO[i, j] by weight summing, for each pixel, input value IN[i, j] and moire correction value AM[i, j], by using the moire correction weight W_MOIRE[i, j]. Specifically, the final correction value may be a sum of a value obtained by multiplying the input values IN_R[i, j], IN_G[i, j], and IN_B[i, j] respectively by the moire correction weight W_MOIRE[i, j] and a value obtained by multiplying moire correction values AM_R[i, j], AM_G[i, j], and AM_B[i, j] by 1−W_MOIRE[i, j]. In other words, a weighted sum of the input value of the current pixel and the moire correction value of the current pixel may be the final correction value.

$$AM\_R[i,j] = \quad \text{[Equation 6]}$$
$$IN\_W[i,j] \times \sum_{k \in \{-n,+n\}} \sum_{l \in \{-m,+m\}} IN\_R[i+k, j+l] \div$$
$$\sum_{k \in \{-n,+n\}} \sum_{l \in \{-m,+m\}} IN\_W[i+k, j+l]$$

$$AM\_G[i,j] = IN\_W[i,j] \times$$
$$\sum_{k \in \{-n,+n\}} \sum_{l \in \{-m,+m\}} IN\_G[i+k, j+l] \div$$
$$\sum_{k \in \{-n,+n\}} \sum_{l \in \{-m,+m\}} IN\_W[i+k, j+l]$$

$$AM\_B[i,j] = IN\_W[i,j] \times$$
$$\sum_{k \in \{-n,+n\}} \sum_{l \in \{-m,+m\}} IN\_B[i+k, j+l] \div$$
$$\sum_{k \in \{-n,+n\}} \sum_{l \in \{-m,+m\}} IN\_W[i+k, j+l]$$

$$IN\_W[i,j] = (IN\_R[i,j] + IN\_G[i,j] + IN\_B[i,j]) \div 3$$

The image correction unit 205 may calculate the moire correction value AM[i, j] as shown in Equation 6. An input white value IN_W[i, j] of the current pixel may be obtained from an average of an input red value IN_R[i, j], an input green value IN_G[i, j], and an input blue value IN_B[i, j]. The moire correction value AM[i, j] may be expressed by a value obtained by multiplying the input white value IN_W[i, j] by a value obtained by dividing a sum of the input values for the respective colors of pixels in a certain block by a sum of the input white values in the block. The block may consist of (2n+1)×(2m+1) pixels (n≥0, m≥0) around the current pixel. AM_R[i, j] is a value obtained as a result of moire correction of an input red value of the current pixel. AM_G [i, j] is a value obtained as a result of moire correction of an input green value of the current pixel. AM_B[i, j] is a value obtained as a result of moire correction of an input blue value of the current pixel.

As the moire correction weight W_MOIRE[i, j] increases, the output pixel value gets closer to the input value. As the moire correction weight W_MOIRE[i, j] decreases, the output pixel value gets closer to the moire correction value is output. When the moire correction weight W_MOIRE[i, j] is a maximum weight of 255, the input value of a pixel may be output without moire correction. When the moire correction weight W_MOIRE[i, j] is a minimum weight of 0, a value of moire corrected pixel, i.e., a moire correction value of a pixel, may be output.

As the threshold value th increases, a moire reduction effect increases, but the color smear effect increases. As the threshold value th decreases, the moire reduction effect decreases and the color smear effect decreases. Accordingly, the user needs to appropriately select the threshold value th according to an application or a camera system.

Figure 3:
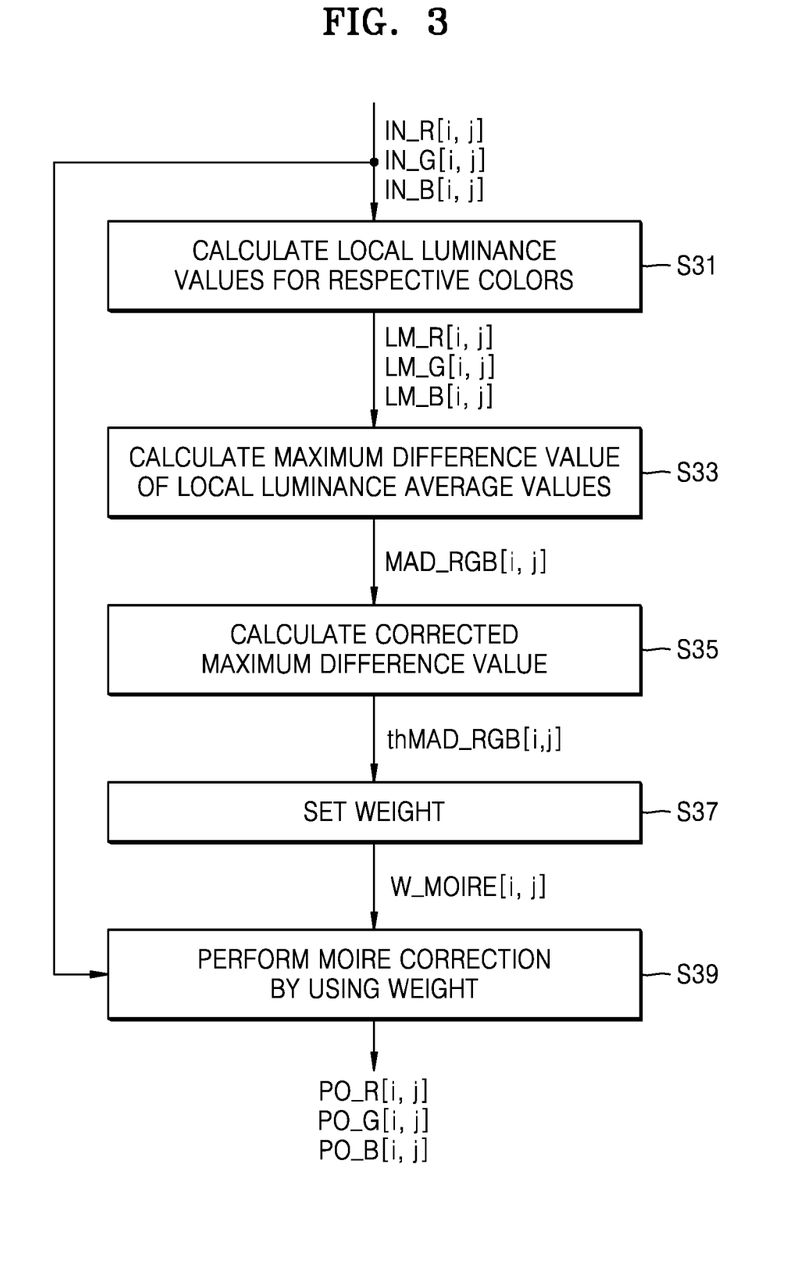
FIG. 3 is a flowchart schematically illustrating a method of reducing color moire according to an exemplary embodiment.

FIG. 3 is a flowchart schematically illustrating a method of reducing color moire according to an exemplary embodiment.

Referring to FIG. 3, in operation S31, the image processor 20 may calculate the local luminance average values for the respective colors of a current pixel LM_R[i, j], LM_G[i, j], and LM_B[i, j] by using an input value for each color of a current pixel of an input mage, that is, the input red value IN_R[i, j], the input green value IN_G[i, j], and the input blue value IN_B[i, j].

In operation S33, the image processor 20 may calculate a difference between the local luminance average values for the respective colors of a current pixel LM_R[i, j], LM_G[i, j], and LM_B[i, j], and a maximum difference value MD_RGB[i, j] having a largest difference.

In operation S35, the image processor 20 may compare the maximum difference value MAD_RGB[i, j] and the threshold value th set by a user input, and determine a smaller value between the maximum difference value MAD_RGB[i, j] and the threshold value th to be the corrected maximum difference value thMAD_RGB[i, j].

In operation S37, the image processor 20 may set the moire correction weight W_MOIRE[i, j] based on the threshold value th and the corrected maximum difference value thMAD_RGB[i, j]. The moire correction weight W_MOIRE[i, j] may be set to be in a range between a maximum weight Wmax, e.g., 1, and a minimum weight Wmin, e.g., 0. Alternatively, the moire correction weight W_MOIRE[i, j] may be set to be the maximum weight Wmax, e.g., 1, or the minimum weight Wmin, e.g., 0.

In operation S39, the image processor 20 may perform moire correction based on the moire correction weight W_MOIRE[i, j]. Specifically, the image processor 20 may adjust a strength of the moire correction by using the moire correction weight W_MOIRE[i, j] for the current pixel, and output the weight summed final correction values PO_R[i, j], PO_G[i, j], and PO_B[i, j].

Generally, a maximum difference value of a bright image is greater than a maximum difference value of a dark image. In the exemplary embodiments illustrated in FIGS. 2 and 3, when the threshold value th is a fixed value and used for all pixels of an image. In this case, the color smear may be prevented at an edge of the bright image, but may occur at an edge of the dark image. For example, when the threshold value is low, a probability of occurrence of the color smear is low, but the moire correction effect is also low. As such, moire may not be sufficiently removed. When the threshold value is high, although the moire correction effect is high, a probability of occurrence of the color smear side effect is also high. As a result, the color smear is likely to occur at a color edge.

Figure 4:
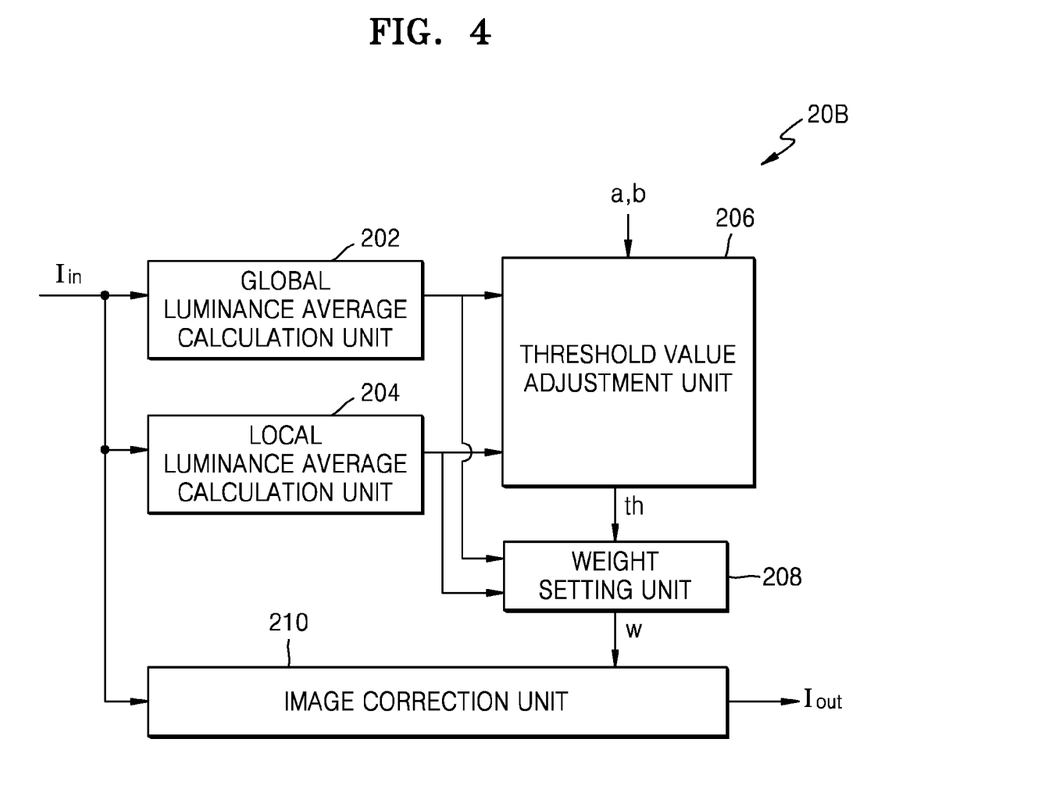
FIG. 4 is a schematic block diagram of a color moire reduction unit according to another exemplary embodiment.

FIG. 4 is a schematic block diagram of a color moire reduction unit 20B according to another exemplary embodiment.

The color moire reduction unit 20B may be implemented as a part of the image processor 20 of FIG. 1. Alternatively, the color moire reduction unit 20B may be implemented as another processor.

Referring to FIG. 4, the color moire reduction unit 20B may include a global luminance average calculation unit 202, a local luminance average calculation unit 204, a threshold value adjustment unit 206, a weight setting unit 208, and an image correction unit 210. The color moire reduction unit 20B may perform moire correction by adaptively applying a threshold value for determining a degree of color smearing or a degree of moire correction for each pixel according to the global luminance and the local luminance of the image.

$$GM\_R = \Sigma IN\_R \div \text{the number of all pixels}$$

$$GM\_G = \Sigma IN\_G \div \text{the number of all pixels}$$

$$GM\_B = \Sigma IN\_B \div \text{the number of all pixels}$$

$$GM = (GM\_R + GM\_G + GM\_B) \div 3 \qquad [\text{Equation 7}]$$

The global luminance average calculation unit 202 may calculate a global luminance average value of an input image Iin. Referring to Equation 7, the global luminance average calculation unit 202 may calculate a red global luminance average value GM_R, a green global luminance average value GM_G, and a blue global luminance average value GM_B with respect to all pixels of the input image Iin. The global luminance average calculation unit 202 may calculate a global luminance average value GM from the global luminance average values for the respective colors.

When the global luminance average value GM is too low, moire may not be reduced sufficiently. By contrast, when the global luminance average value GM is too high, an undesired side effect, e.g., color smear, is likely to occur. Accordingly, the user may set a minimum value and/or a maximum value of the global luminance average value GM according to an application or a system type. For example, a user may set a minimum value of the global luminance average value GM for a camera system such as a closed-circuit television (CCTV) that mostly acquires dark images. On the other hand, a user may set a maximum value of the global luminance average value GM for a camera system such as a camera for broadcast or a TV set that mostly acquires bright images.

The local luminance average calculation unit 204 calculates, from the input image Iin, local luminance average values for the respective colors of each pixel, differences between the local luminance average values for the respective colors, and a maximum difference value. Since the calculations of the local luminance average values for the respective colors and the maximum difference value by the local luminance average calculation unit 204 are described above referring to Equations 1 and 2, descriptions thereof are not repeated here.

The local luminance average calculation unit 204 may calculate a local luminance average value LM[i, j] of each pixel from the local luminance average values for the respective colors as shown in Equation 8 below. The user may set a minimum value and a maximum value of a local luminance average value LM according to an application or a system type.

$$Lth[i,j] = \text{MIN}(GM, LM[i,j])$$

$$LM[i,j] = (LM\_R[i,j] + LM\_G[i,j] + LM\_B[i,j]) \div 3 \qquad [\text{Equation 8}]$$

The threshold value adjustment unit 206 may calculate a local threshold value Lth[i, j] of the current pixel, as shown in Equation 8, from the global luminance average value GM and the local luminance average value LM[i, j] calculated from the current pixel. The threshold value adjustment unit 206 may compare the global luminance average value GM and the local luminance average value LM[i, j] calculated from the current pixel and determine a smaller value between the global luminance average value GM and the local luminance average value LM[i, j] to be the local threshold value Lth[i, j].

$$Lth[i,j] = \text{MIN}(GM \times A, LM[i,j] \times B) \qquad [\text{Equation 9}]$$

As shown in Equation 9, in another exemplary embodiment, the threshold value adjustment unit 206 may calculate the local threshold value Lth[i, j] by adjusting the global luminance average value GM and the local luminance average value LM[i, j] using value A or value B that is a weight input from the user. The weight may be a constant or a function set based on experiences or experiments. The user may increase the moire reduction effect in a dark moire area of a dark image by increasing the value B.

$$athMAD\_RGB[i,j] = mi(MAD\_RGB[i,j], Lth[i,j]) \qquad [\text{Equation 10}]$$

As shown in Equation 10, the weight setting unit 208 may calculate an adaptive maximum difference value athMAD_RGB[i, j] of the current pixel from the maximum difference value MAD_RGB[i, j] and the local threshold value Lth[i, j]. The weight setting unit 203 may compare the maximum difference value MAD_RGB[i, j] and the local threshold value Lth[i, j] and determine a smaller value between the maximum difference value MAD_RGB[i, j] and the local threshold value Lth[i, j] to be the adaptive maximum difference value athMAD_RGB[i, j].

$$W\_MOIRE[i,j] = athMAD\_RGB[i,j]/Lth[i,j] \qquad [\text{Equation 11}]$$

The weight setting unit 208 may set a moire correction weight of the current pixel based on the adaptive maximum difference value of the current pixel. Referring to Equation 11, the weight setting unit 208 may set the moire correction weight W_MOIRE[i, j] by adjusting the adaptive maximum difference value athMAD_RGB[i, j] of the current pixel by using the local threshold value Lth[i, j]. The threshold value th may be a constant or a function set from experiences or experiments. The threshold value th may be set by a user input.

While performing moire correction by performing color blurring on an input image, the image correction unit 210 may adjust a strength of moire correction for each pixel by using the moire correction weight W_MOIRE[i, j]. The image correction unit 210 may output a final corrected image by weight summing the input image and the moire corrected image obtained by performing color blurring on the input image, by using the moire correction weight W_MOIRE[i, j].

The image correction unit 210 may output the final correction value PO[i, j] by weight summing, by using the moire correction weight W_MOIRE[i, j], the input value IN[i, j] and the moire correction value AM[i, j] obtained by performing color blurring on the input value IN[i, j], for each pixel. Since the calculation of the final correction value PO[i, j] by the image correction unit 210 is described above with reference to Equations 5 and 6, a description thereof is not repeated here.

Figure 5:
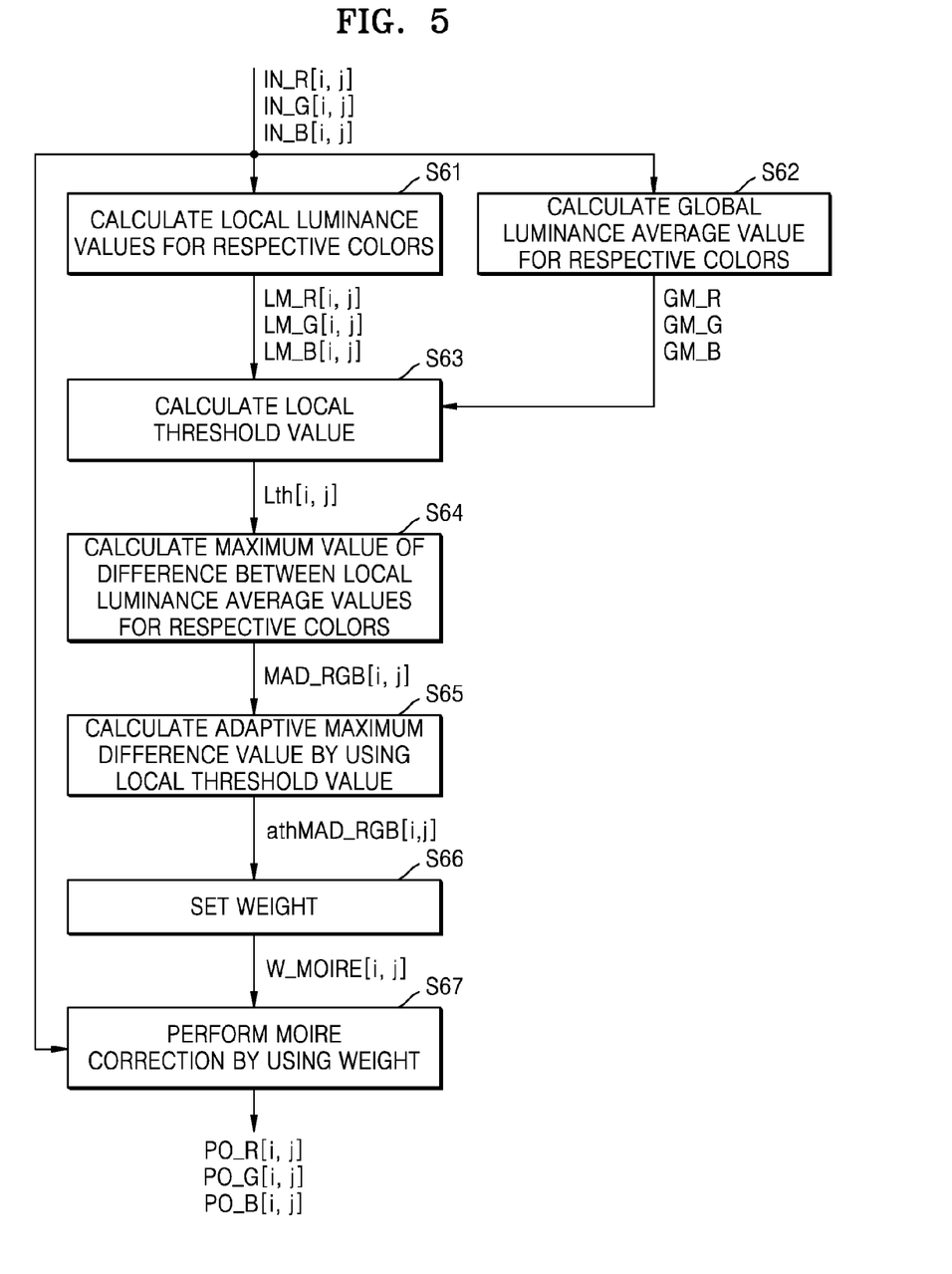
FIG. 5 is a flowchart schematically illustrating a method of reducing color moire according to another exemplary embodiment.

FIG. 5 is a flowchart schematically illustrating a method of reducing color moire according to another exemplary embodiment.

In operation S61, the image processor 20 may calculate the local luminance average values for the respective colors of a current pixel, that is, the red local average value LM_R[i, j], the green local average value LM_G[i, j], and the blue local average value LM_B[i, j] may be calculated by using input values for the respective colors of a current pixel of a current input image, that is, the input red value IN_R[i, j], the input green value IN_G[i, j], and the input blue value IN_B[i, j].

In operation S62, the image processor 20 may calculate the global luminance average values for the respective colors of the current input image, that is, the red global luminance average value GM_R, the green global luminance average value GM_G, and the blue global luminance average value GM_B.

In operation S63, the image processor 20 may calculate the local threshold value Lth[i, j] of the current pixel from the global luminance average values for the respective colors GM_R, GM_G, and GM_B and the local luminance average values for the respective colors LM_R[i, j], LM_G[i, j], and LM_B[i, j]. The image processor 20 may calculate the global luminance average value GM from the global luminance average values for the respective colors GM_R, GM_G, and GM_B. The image processor 20 may calculate the local luminance average value LM[i, j] the local luminance average values for the respective colors LM_R[i, j], LM_G[i, j], and LM_B[i, j]. The image processor 20 may determine the local threshold value Lth[i, j] by selecting one of the global luminance average value GM and the local luminance average value LM[i, j].

In operation S64, the image processor 20 may calculate differences between the local luminance average values for the respective colors of a current pixel LM_R[i, j], LM_G[i, j], and LM_B[i, j] and the maximum difference value MAD_RGB[i, j] having the largest difference.

In operation S65, the image processor 20 may determine a smaller value between the maximum difference value MAD_RGB[i, j] and the local threshold value Lth[i, j] to be the adaptive maximum difference value athMAD_RGB[i, j].

In operation S66, the image processor 20 may set the moire correction weight W_MOIRE[i, j] based on the adaptive maximum difference value athMAD_RGB[i, j] of the current pixel. The moire correction weight W_MOIRE[i, j] may be set to be a value in a range between the maximum weight Wmax, e.g., 1, and the minimum weight Wmin, e.g., 0. Alternatively, the moire correction weight W_MOIRE[i, j] may be set to be the maximum weight Wmax or the minimum weight Wmin.

In operation S67, the image processor 20 may adjust a strength of moire correction by using the moire correction weight W_MOIRE[i, j] for the current pixel, and output the weight summed final correction values PO_R[i, j], PO_G[i, j], and PO_B[i, j].

The color smear may occur in a dark image more frequently than in a bright image. Accordingly, a low threshold value may be set for a dark image to reduce the color smear, and a high threshold value may be set for a bright image to lessen moire correction effect. When the global luminance average value is used as the threshold value, although the color smear in a dark image may be reduced, the color smear effect may occur in a dark area of a bright image. When the local luminance average value is used as the threshold value, although the color smear may be reduced in a dark area of a bright image, the color smear may be occur in a very bright area. Accordingly, the threshold value th, which is a criterion used to determine whether it is a color moire area or a color edge area, needs to be adjusted according to the global luminance of the image and/or the local luminance of the image. In the exemplary embodiment illustrated in FIGS. 4 and. 5, since the smaller value between the global luminance average value and the local luminance average value is used as the threshold value, the moire and color smear can be reduced more strongly.

Figure 6:
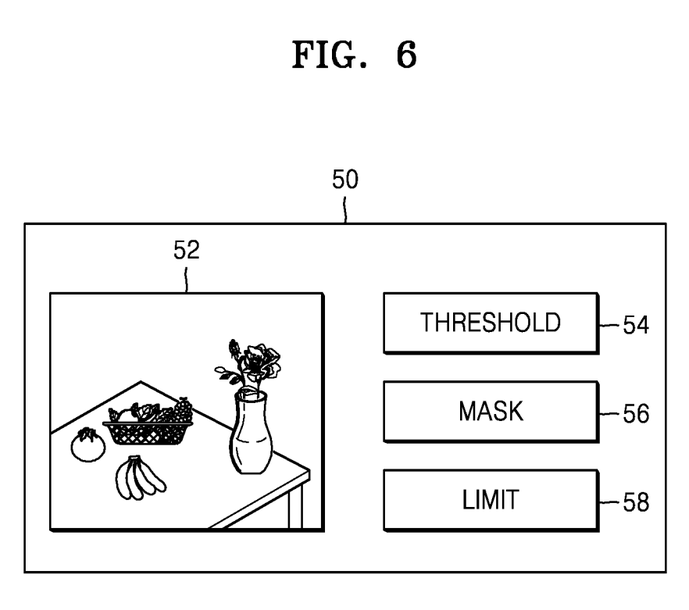
FIG. 6 illustrates a graphic user interface provided by an image processor according to an exemplary embodiment.

FIG. 6 illustrates a graphic user interface provided by the image processor 20 according to an embodiment.

The image processor 20 may provide a user interface 50 for inputting a parameter for moire correction of an image on the display 30 of FIG. 1. The interface 50 may display at least one of a real-time image and a correction image on the first area 52.

The user may set a threshold value, or a value A and/or a value B for adjusting the threshold value, by using a threshold value setting field 54.

The user may set the size of a block by using a mask setting field 56.

The user may set the minimum value and the maximum value of the global luminance average value GM and/or the local luminance average value LM[i, j] by using a limit setting field 58.

The user may directly input or selectively input various parameters according to an input form provided by the interface 50.

In the above-described exemplary embodiments, the global luminance average value and the local luminance average value are calculated by using the global luminance average values for the respective colors and the local luminance average values for the respective colors. However, exemplary embodiments are not limited thereto, and a variety of other methods of indicating global luminance and local luminance may be employed. For example, RGB signals may be converted to YUB signals and then a Y value may be calculated.

As described above, in the method of reducing color moire and the image processing apparatus according to the exemplary embodiments, unwanted color smear effect may be prevented while color moire is effectively reduced.

The inventive concept can also be embodied as computer readable codes on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributive manner. Also, functional programs, codes, and code segments for accomplishing the present inventive concept can be easily construed by programmers skilled in the art to which the present inventive concept pertains.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of reducing moire, the method comprising:
    generating a moire-corrected image by performing moire correction on an input image;
    setting a moire correction weight for each pixel of the input image based on global luminance of the input image and local luminance of an area including the pixel; and
    correcting the moire-corrected image by synthesizing the input image and the moire-corrected image based on the moire correction weight,
    wherein the setting of the moire correction weight comprises:
    calculating a global luminance average value of the input image and a local luminance average value of the area including the pixel;
    determining a largest value from among differences between local luminance average values, which are calculated for red, green, and blue, respectively, to be a first maximum difference value; and
    setting the moire correction weight of the pixel based on the first maximum difference value.

2. The method of claim 1, wherein the setting of the moire correction weight comprises:
    generating a second maximum difference value by correcting the first maximum difference value; and
    setting the moire correction weight of the pixel using the second maximum difference value, and wherein the second maximum difference value is a smaller value between the first maximum difference value and a threshold value.

3. The method of claim 2, wherein the threshold value is determined by an input received through a user interface.

4. The method of claim 2, wherein the threshold value is one of the global luminance average value and the local luminance average value.

5. The method of claim 2, wherein the threshold value is a value obtained by applying a weight to one of the global luminance average value and the local luminance average value.

6. The method of claim 5, wherein the weight is determined by an input received through a user interface.

7. The method of claim 1, wherein the area is determined by an input received through a user interface.

8. The method of claim 2, wherein the moire correction weight is determined based on a ratio of the second maximum difference value to the threshold value.

9. The method of claim 1, wherein at least one of an upper limit value and a lower limit value is set to at least one of the global luminance average value and the local luminance average value, and
    wherein the upper limit value and the lower limit value are determined by an input received through a user interface.

10. An image processing apparatus comprising at least one processor to implement:
    a first unit configured to generate a moire-corrected image by performing moire correction on an input image and set a moire correction weight for each pixel of the input image based on global luminance of the input image and local luminance of an area including the pixel; and
    a second unit configured to correct the moire-corrected image by synthesizing the input image and the moire-corrected image based on the moire correction weight,
    wherein the first unit comprises:
    an average calculation unit configured to calculate a global luminance average value of the input image and a local luminance average value of the area including the pixel, and calculate a largest value from among differences between local luminance average values, which are calculated for red, green, and blue, respectively, to be a first maximum difference value; and
    a weight setting unit configured to set the moire correction weight of the pixel based on the first maximum difference value.

11. The image processing apparatus of claim 10, wherein the weight setting unit is further configured to calculate a second maximum difference value by correcting the first maximum difference value and set the moire correction weight of the pixel using the second maximum difference value, and
    wherein the second maximum difference value is a smaller value between the first maximum difference value and a threshold value.

12. The image processing apparatus of claim 11, wherein the threshold value is determined by an input received through a user interface.

13. The image processing apparatus of claim 11, wherein the threshold value is one of the global luminance average value and the local luminance average value.

14. The image processing apparatus of claim 11, wherein the threshold value is a value obtained by applying a weight to one of the global luminance average value and the local luminance average value.

15. The image processing apparatus of claim 14, wherein the weight is determined by an input received through a user interface.

16. The image processing apparatus of claim 10, wherein the area is determined by an input received through a user interface.

17. The image processing apparatus of claim 11, wherein the moire correction weight is determined based on a ratio of the second maximum difference value to the threshold value.

18. The image processing apparatus of claim 10, wherein at least one of an upper limit value and a lower limit value is set to at least one of the global luminance average value and the local luminance average value, and
    wherein the upper limit value and the lower limit value are determined by an input received through a user interface.

* * * * *